(12) United States Patent
Grimberg et al.

(10) Patent No.: US 6,474,264 B1
(45) Date of Patent: Nov. 5, 2002

(54) METHOD OF IMPROVING FISH BREEDING CONDITIONS OPERATING IN OZONATED WATER

(75) Inventors: Aurélie Grimberg, Saint-Cloud (FR); Jean-Marc Rabillier, Guyancourt (FR)

(73) Assignee: L'Air Liquide Societe Anonyme a Directoire et Counseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/634,647

(22) Filed: Aug. 8, 2000

(30) Foreign Application Priority Data

Aug. 18, 1999 (FR) .............................. 99 10603

(51) Int. Cl.⁷ ............................ A01K 61/00; C02F 1/78
(52) U.S. Cl. ........................ 119/231; 119/215; 210/760
(58) Field of Search ................................ 119/231, 215, 119/228, 263; 210/600, 601, 602, 604, 717, 760

(56) References Cited

U.S. PATENT DOCUMENTS

| | | | |
|---|---|---|---|
| 4,052,960 A | 10/1977 | Birkbeck et al. | |
| 4,765,807 A | * 8/1988 | Henriksen | 95/54 |
| 4,972,801 A | * 11/1990 | Hunt | 119/215 |
| 5,076,209 A | 12/1991 | Kobayashi et al. | |
| 5,695,635 A | * 12/1997 | Sasaki et al. | 210/188 |
| 5,732,654 A | 3/1998 | Perez et al. | |
| 5,893,337 A | * 4/1999 | Sevic | 119/215 |

FOREIGN PATENT DOCUMENTS

| | | | |
|---|---|---|---|
| JP | 03 216131 | * 9/1991 | 119/231 |
| JP | 04 172638 | 6/1992 | |
| JP | 08 023823 | 1/1996 | |
| JP | 08 304383 | 11/1996 | |

* cited by examiner

Primary Examiner—Yvonne R. Abbott
(74) Attorney, Agent, or Firm—Burns, Doane, Swecker & Mathis, L.L.P.

(57) ABSTRACT

A method of improving conditions for breeding aquatic life in a breeding farm comprising the steps of injecting an ozonated gas into a stream of water to achieve a level of ozonation; adding a reducing chemical species to the stream of water in order to substantially remove a possible content of oxidizing by-products and/or ozone resulting from the step of injecting the ozonated gas; and feeding the stream of water to a breeding basin wherein the reducing chemical species is added to the stream of water in situ and continuously between the step of injecting the ozonated gas and the step of feeding the stream of water into the breeding basin.

24 Claims, 2 Drawing Sheets

METHOD OF IMPROVING FISH BREEDING CONDITIONS OPERATING IN OZONATED WATER

BACKGROUND OF THE INVENTION (i) Field of the Invention

The present invention relates to the fields of aquiculture and pisciculture, and relates in particular to breeding farms where an ozone treatment is carried out of all or some of the water which supplies the breeding basin(s) of the user site.

(ii) Description of the Related Art

Ozone treatment of such breeding farms has been the subject of a very abundant literature. Reference may be made for example to French patent application in the name of the Applicant FR-99 06567 which relates to the ozonation of breeding farms operating in a closed circuit. Underlying the considerable importance of treating the water which supplies the basins (sanitation, productivity and the like), difficulties and questions remain regarding the use of ozonation treatments. This is linked, in particular, to the fact that the residual species from an ozone treatment can be toxic for the species raised, whether this is the ozone residue itself in the medium or, alternatively, all of the oxidizing by-products derived from the oxidation reactions of the ozone on the medium (in particular on seawater)

The existing solutions, reported in the literature (active charcoal filter, "stripping" and the like), for removing these traces of ozone or of oxidizing by-products are not very satisfactory in the context of the pisciculture, and in particular for the ozone treatment of seawater. This is either because the cost of exploiting them is high, or because they are unprofitable for high outputs of water to be treated, or quite simply because they are inapplicable to seawater.

SUMMARY AND OBJECTS OF THE INVENTION

One of the objectives of the present invention is therefore in particular to provide a method which makes it possible to improve the conditions for the breeding of fish and other sea products (pisciculture and aquiculture), using an ozone treatment of all or some of the water which supplies the breeding basins. The method is applicable to both seawater and freshwater breeding. The method is applicable to breeding farms operating in a closed circuit or in an open circuit. One of the intended aims is not to be limited in the levels of ozone treatment which are applied, while providing real safety for the species raised.

The present invention therefore relates to a method of improving the breeding conditions in pisciculture or aquiculture. The breeding is of the type where an ozone treatment is carried out on all or some of the water which supplies at least one breeding basin. The method involves carrying out a chemical treatment of the stream of ozonated water which supplies the breeding basin, before it reaches the basin. The method involves addition of a reducing chemical species, in order to carry out the substantial removal of the possible oxidizing by-products of the treatment of the water with ozone, and/or of the ozone residue in the water, in the following manner:

the reducing chemical species is added in situ and continuously on a line which is connected at its downstream part to the breeding basin and at its upstream part to a point where the ozonation treatment of the stream of water is carried out.

The method according to the invention can also adopt one or more of the following characteristics:

an evaluation of the content of dissolved ozone and/or of oxidizing by-products in the water is carried out, downstream of the point of addition of the reducing species, and retroactive action is taken where appropriate, according to the result of this evaluation, on the conditions for addition of the reducing species to the stream of water;

an evaluation of the content of dissolved ozone and/or of oxidizing by-products in the water is carried out, upstream of the point of addition of the reducing species, and the conditions for addition of the reducing species are regulated according to the result of the evaluation;

the addition of the reducing chemical species is adjusted according to the level of ozonation of the stream of ozonated water, the adjustment being carried out at the stoichiometric level;

an evaluation of the content of dissolved ozone and/or of oxidizing by-products in the water is carried out, downstream of the point of addition of the reducing species, the evaluation being carried out with the aid of a system operating on the principle of the redox potential, in order to provide a relative value capable of triggering, depending on the result of the evaluation, an alarm and/or a retroaction on the conditions for addition of the reducing species;

the point where the ozonation treatment is carried out is provided with one or more of the following components: a component for on-line gas/liquid transfer such as a static mixer or a hydroinjector, and a contact-maker such as a contact tower;

the breeding farm operates in a closed circuit, according to which:
a) at least some of the water of at least one breeding basin is recycled, which recycled water undergoes one or more purification treatments before being reinjected into the basin considered;
b) on the recycling path of step a), the recycled water is mixed with a supply of fresh water;
c) an ozonation of all or some of the recycled water is carried out, and furthermore where appropriate an ozonation of all or some of the supply of fresh water is carried out before it is mixed with the recycled water;

the addition of the reducing chemical species being carried out in the water recirculation circuit, downstream of the point where the ozonation is carried out.

The breeding farm operates in a closed circuit, according to which:
a) at least some of the water of at least one breeding basin is recycled, which recycled water undergoes one or more purification treatments before being reinjected into the basin considered;
b) on the recycling path of step a), the recycled water is mixed with a supply of fresh water;
c) an ozonation of all or some of the supply of fresh water is carried out before it is mixed with the recycled water;

the addition of the reducing chemical species being carried out in the supply of ozonated fresh water before it is mixed with the recycled water, or alternatively in the mixture of recycled water and of ozonated fresh water, before this mixture reaches the breeding basin.

the addition of the reducing species is carried out by metered additions, to the stream of water to be chemically treated, of a solution of a salt of the reducing species.

Other characteristics and advantages of the invention will emerge from the following description, given solely by way of illustration and with no limitation being implied, and made with reference to the appended drawings.

DETAILED DESCRIPTION OF PREFERRED EMBODIMENTS

Figure 1:
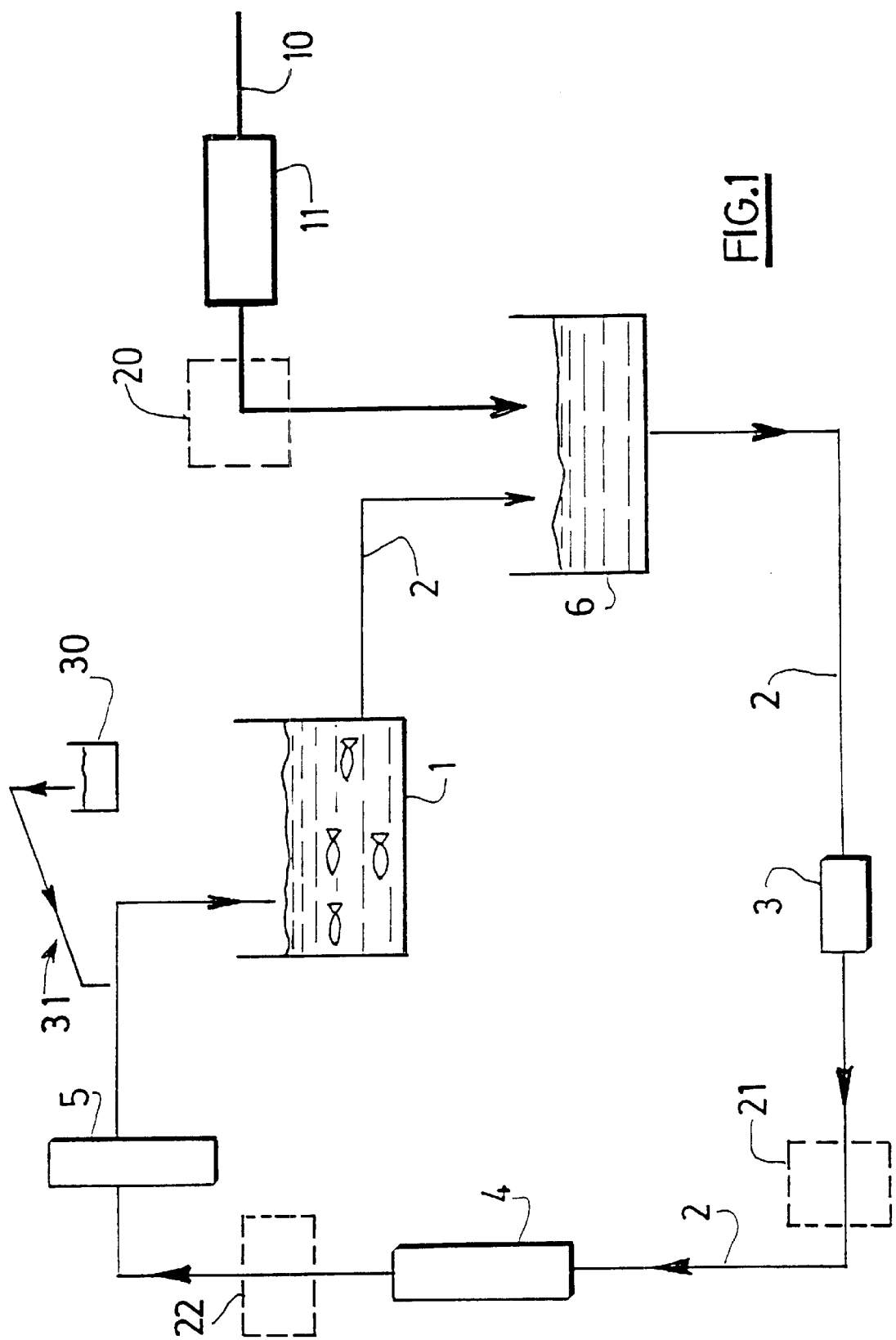
FIG. 1 is a schematic representation of an example of an installation for the breeding of seawater fish in a closed circuit in accordance with the invention.

There has been illustrated in FIG. 1 the presence of a basin 1 for the breeding of seawater fish (a basin or one of the basins of the breeding site considered), in which at least some of the seawater is recirculated by the recirculation line 2.

The seawater thus recirculated undergoes during its course a number of purification steps, among which there may be a passage over a mechanical filter 3, a passage through a (nitrifying and then denitrifying) biological filter 4, as well as a degassing column 5 which makes it possible in particular to remove the dissolved nitrogen or carbon dioxide.

Moreover, a supply of fresh water (via the line 10 represented in the figure with a thick line) can be noted on the right of the figure, the mixing between the recycled water coming from the tank 1 and the supply of fresh water being carried out in a retention tank 6.

For the embodiment represented, the supply of fresh water passes, before reaching the retention tank 6, through a mechanical filtration step 11, or through a heat exchanger (not represented in the figure) to bring, where appropriate, the supply of fresh water to an optimum temperature for the growth of the species.

Examples of locations for injection of ozonated gas which makes it possible to carry out the ozonation treatment of the water have been represented in the figure by rectangles drawn with a discontinuous line, respectively on the line for supplying the fresh water downstream of the mechanical filtration system (20), on the line for the recycling of the water for the basin 1, coming from the retention tank 6, upstream and downstream (21 and 22) of the biological filter 4.

The arrival, on the recirculation line 2, downstream of the degassing column 5, of an addition of a reducing species, in this case for the embodiment represented coming from a tank 30 containing a solution of sodium bisulfite, can then be recognized in this FIG. 1.

As will appear clearly to persons skilled in the art, the use of reducing chemical species which do not represent a toxic character for the species raised, either initially (reduced form) or after reaction (oxidized form), is favored according to the invention.

Figure 2:
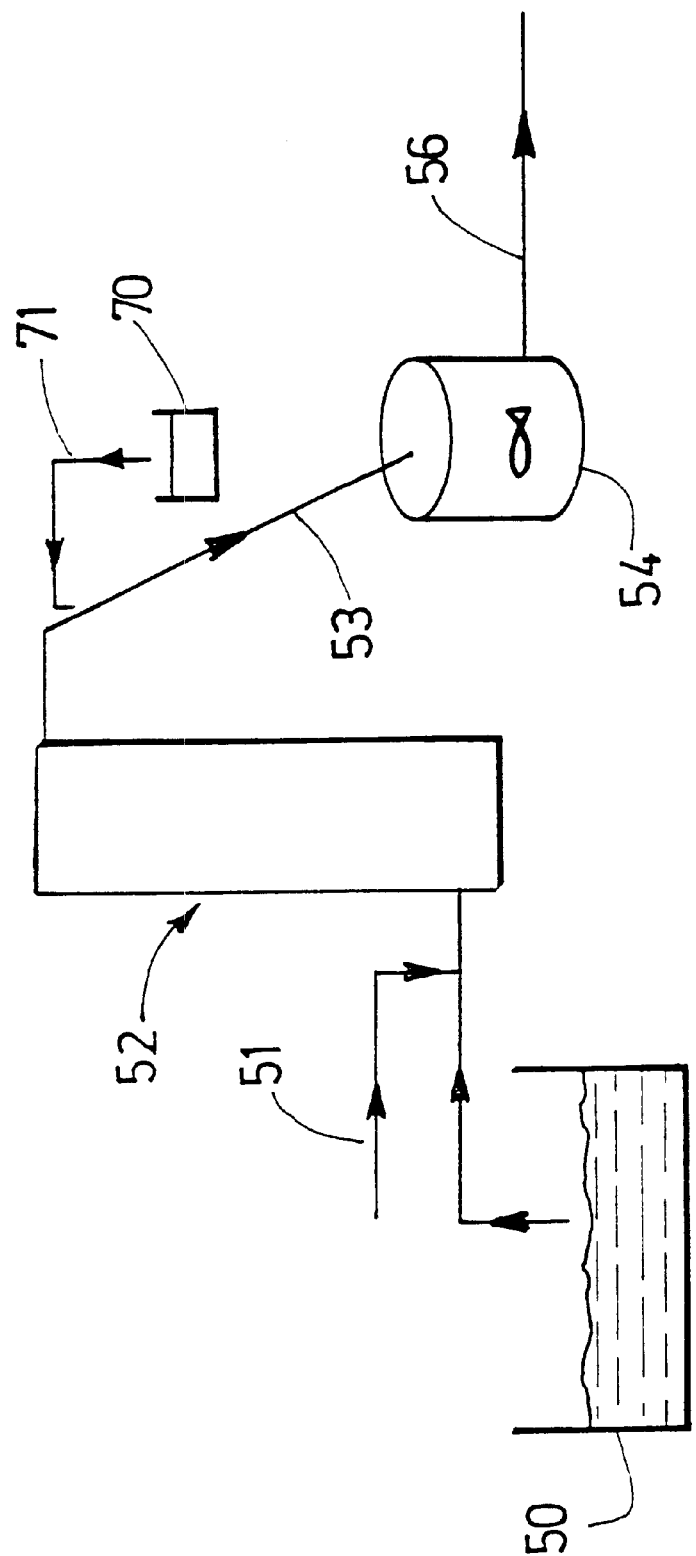
FIG. 2 is a schematic representation of an example of an installation for the breeding of seawater fish in an open circuit in accordance with the invention.

FIG. 2 illustrates, for its part, the case of a seawater fish breeding farm operating in an open circuit (as indicated by the arrow 56 at the outlet of the breeding basin 54), in which figure the presence of a source or reservoir 50 of seawater to be treated, the addition to the stream of seawater coming from the source 50 of an ozonated gas 51, the seawater thus ozonated passing through a contact basin (or tower) 52, can be recognized.

The breeding basin 54 is then supplied from this contact tower 52 and via a pipe 53. The addition of the solution of a salt of the sulfite type is made here (70, 71) at a level of the pipe 53 and therefore downstream of the contact tower 52.

During a first series of tests carried out in the laboratory, and in batch mode, seawater samples (coming from a turbot breeding farm operating in a closed circuit), treated according to the following approach, were tested:

1) tests of reduction of the oxidizing agents initially present in the seawater (before ozonation) by addition of sodium metabisulfite: use of a solution with a titer of 1 g/liter, in proportions ranging from one to four times the stoichiometry calculated relative to the initial oxidizing agents measured;

2) ozonation of samples of seawater/levels of treatments chosen: 0.1, 0.2, 0.3, 0.5 and 1 mg O3 per liter of seawater;

3) monitoring of the residual oxidizing agents generated by the ozonation, as a function of time (by the spectrophotometric method-assay of total chlorine with the colored reagent DPD); and 4) neutralization of the residual oxidizing agents generated by the ozonation and measurement of the residual oxidizing agents after such a neutralization treatment (addition of the bisulfite in a stoichiometric quantity relative to the oxidizing agents measured).

The following lessons can therefore be drawn from this first series of tests:

i) the residual oxidizing agents generated by the ozonation decrease very slowly when they are not neutralized by the addition of bisulfite (which may be up to 15 minutes or more, depending on the level of ozonation treatment used);

ii) the addition of a stoichiometric quantity of bisulfite makes it possible to neutralize the oxidizing agents formed, the reaction being in fact very rapid (in less than one minute, the residual content of oxidizing agent returns to the initial value in the water before ozonation);

iii) these oxidizing agents initially present in the seawater are not neutralized by the bisulfite, even for treatment of up to four times the stoichiometry.

A second series of tests was carried out on a breeding installation such as that represented in the context of FIG. 2, under the following conditions:

1) an output of 1600 l/h of seawater in open circuit (56) is treated continuously for 14 h, the levels of ozone treatment tested being situated in the preferred range according to the invention, i.e. between 0.05 and 2 mg of ozone/liter.

A column reactor (52) provides a contact time.

A solution (70) of sodium metabisulfite $Na_2S_2O_5$ at 200 mg/l is added with the aid of a metering pump to the outlet pipe of the column reactor (53), under 1/1 molar ratio stoichiometric conditions relative to the quantity of ozone introduced into the water.

After less than 10 seconds, the water thus treated supplies a tank (54) containing 1 g bass alevins.

2) the content of oxidizing agents in the fish tank is monitored by manual spectrophotometric assay of the total chlorine with the colored reagent DPD at 530 nm (HACH method No. 8311, HACH 80 procedure for the portable spectrophotometer DR 2010):

without ozone treatment, the content of the oxidizing agents is 0.02 mg Cl2/l (±0.01 mg/l);

with ozone treatment and without neutralization with bisulfite, the content of oxidizing agents is 0.08 mg C12/i (±0.01 mg/i);

with ozone treatment followed by neutralization with sodium bisulfite, the content of oxidizing agents is 0.02 mg C12/l (±0.01 mg/i);

3) the fish (200 in number) in the water thus treated are observed in comparison with a control batch of fish in a similar basin supplied with untreated water. The behavior of the fish is observed and histograms are prepared on the sensitive organs: eyes, liver, mucous membranes.

The following lessons can therefore be drawn from this second series of tests:

i) at the ozone treatment doses used, the behavior of the fish is not modified (with or without neutralization with sodium bisulfite);

ii) the ozone treatment and without neutralization of the residual oxidizing agents, 20% of the fish exhibit benign sequelae (phenomena of nonspecific irritation); and iii) with ozone treatment followed by neutralization of the residual oxidizing agents with sodium bisulfite, the rate of detection of the phenomenon of benign irritation is identical to that for a control batch of fish (for which the water was not treated with ozone)

It can therefore be seen in the light of the entire preceding description that in the context where the use of ozone in piscicultural and aquicultural breeding becomes widespread, but where difficulties for carrying out the ozonation treatments remain in some systems, the method according to the present invention unquestionably provides a very attractive and promising response for improving the conditions for such breeding farms operating under ozone treatment conditions.

As already indicated above, the use of reducing chemical species which are not toxic for the species raised, either initially (reduced form) or after reaction (oxidized form), is favored.

The excellent results obtained by the use of an added reducing species of the sulfite type has been shown. By way of illustration, the added species may advantageously contain a group of the sulfite $SO_3^{2-}$, bisulfite $HSO_3^-$, metabisulfite $S_2O_5^{2-}$ or alternatively thiosulfate $S_2O_3^{2-}$ type.

What is claimed is:

1. A method of improving conditions for breeding aquatic life in a breeding farm comprising the steps of:

injecting an ozonated gas into a stream of water to achieve a level of ozonation;

adding a reducing chemical species to said stream of water in order to substantially remove a possible content of one or both of oxidizing by-products and ozone resulting from said step of injecting the ozonated gas;

evaluating the content of one or both of dissolved ozone and ozidizing by-products in the water before or after the step of adding the reducing species, to obtain a result; and, based on the result of said step of evaluating, adjusting where appropriate, the step of adding the reducing chemical species to the stream of water; and feeding said stream of water to a breeding basin;

wherein the reducing chemical species is added to said stream of water in situ and continuously between the step of injecting the ozonated gas and the step of feeding the stream of water into the breeding basin.

2. The method according to claim 1, further comprising adjusting, at a stoichiometric level, the step of adding the reducing chemical species according to the level of ozonation of said stream of ozonated water.

3. The method according to claim 1, further comprising the step of evaluating the content of one or both of dissolved ozone and oxidizing by-products in the water, in order to obtain a result, prior to said step of adding the reducing species to the stream of water, using a system operating on a redox potential principle, in order to provide a relative value capable of triggering, depending on the result of the evaluation, an alarm and/or a retroaction on conditions for the step of adding the reducing species to the stream of water.

4. The method according to claim 1, comprising injecting the ozonated gas into the stream of water with at least one of a component for on-line gas/liquid transfer and a contact-maker.

5. The method according to claim 4, wherein the ozonated gas is injected into the stream of water with a component for on-line gas/liquid transfer, which is a static mixer or a hydro-injector.

6. The method according to claim 4, wherein the ozonated gas is injected into the stream of water with a contact maker, which is a contact tower.

7. The method according to claim 1, comprising operating said breeding farm in a closed circuit, comprising the steps of:

a) recycling at least some of the water of the breeding basin to form a stream of recycled water and purifying the stream of recycled water before re-injecting it into the basin;

b) mixing the recycled water with a supply of fresh water during said recycling step a);

c) ozonizing all or some of the recycled water and, where appropriate, ozonizing all or some of the supply of fresh water before the step of mixing the recycled water with the fresh water; and d) adding the reducing chemical species to the stream of recycled water, after the step of ozonizing the recycled water.

8. The method according to claim 7, comprising ozonizing the fresh water by injection of a gas containing ozone, so as to obtain an ozone treatment level of between 0.5 and 15 mg of ozone/liter of water.

9. The method according to claim 8, wherein the level of treatment of ozone is between 2 and 10 mg of ozone/liter of water.

10. The method according to claim 1, wherein the level of ozonation of said stream of water is between 0.05 and 2 mg of ozone/liter.

11. The method according to claim 10, wherein the level of ozonation of said stream of water is between 0.05 and 0.5 mg of ozone/liter of water.

12. The method according to claim 1, comprising operating said breeding farm in a closed circuit, comprising the steps of:

a) recycling at least some of the water of the breeding basin to form a stream of recycled water and purifying the stream of recycled water before re-injecting it into the basin;

b) mixing the recycled water with a supply of fresh water during said recycling step a) to form a mixture;

c) ozonizing all or some of the supply of fresh water before the step of mixing the fresh water with the recycled water to form ozonated fresh water; and d) adding the reducing chemical species to (1) the supply of ozonated fresh water before it is mixed with the recycled water or (2) to the mixture of recycled water and the supply of ozonated fresh water before the mixture reaches the breeding basin.

13. The method according to claim 1, comprising adding a solution of a salt of the reducing species by metered additions to the stream of water to be treated chemically.

14. The method according to claim 1, comprising adding a reducing species comprising a sulfite group.

15. The method according to claim 14, wherein said reducing species comprises sulfite $SO_3^{2-}$, bisulfite $HSO_3^-$ or metabisulfite $S_2O_5^{2-}$.

16. The method according to claim 13, comprising adding a reducing species comprising a thiosulfate $S_2O_3^{2-}$.

17. An installation for improving conditions for breeding aquatic life comprising:
   a supply line adapted to supply a stream of water for treatment with ozone and deliver the ozone treated water to a breeding basin;
   an injector for adding ozone to said stream of water; and
   a second line adapted for a continuous and in situ addition of a reducing chemical species to said stream of water at a point of addition in said supply line in order to obtain removal of a substantial portion of a possible content of one or both of oxidizing by-products of the treatment of the water with ozone, and ozone residue in the water, wherein said second line is connected to said supply line at a point connected at its downstream part to said breeding basin and at its upstream part to a point where the injector adds ozone to said stream of water.

18. The installation according to claim 17, further comprising:
   a detector which evaluates the content of one or both of dissolved ozone, and oxidizing by-products in the water on said supply line, downstream of the second line; to obtain a result and
   a means for taking retroactive action, where appropriate, according to the result of the evaluation, on conditions for addition of the reducing species.

19. The installation according to claim 17, further comprising:
   a means, on said supply line, for evaluating the content of dissolved ozone and/or of oxidizing by-products in the water and obtaining a result, said means being upstream of the point of addition of the reducing species; and
   means for regulating, according to the result of the evaluation, the conditions for addition of the reducing species.

20. The installation according to claim 17, further comprising:
   means of evaluating the content of dissolved ozone and/or of oxidizing by products in the water to obtain a result, on the line, downstream of the point of addition of the reducing species, said means using a system operating on a redox potential principle, in order to provide a relative value capable of triggering, according to the result of the evaluation, an alarm or of acting retroactively on conditions of addition of the reducing species.

21. The installation according to claim 17, wherein said second line comprises a source of a solution of a salt of said species.

22. The installation according to claim 21, wherein said reducing species in said source comprises a sulfite group.

23. The installation of claim 22, wherein said sulfite group is a sulfite $SO_3^{2-}$, bisulfite $HSO_3^-$, or a metabisulfite $S_2O_5^{2-}$.

24. The installation of claim 21, wherein said reducing species in said source comprises a thiosulfate $S_2O_3^{2-}$ group.

* * * * *